(12) United States Patent
Qin et al.

(10) Patent No.: US 7,100,244 B2
(45) Date of Patent: Sep. 5, 2006

(54) HINGE ASSEMBLY AND PORTABLE ELECTRONIC DEVICE HAVING SAME

(75) Inventors: Shui Yuan Qin, Shenzhen (CN); Chia-Hua Chen, Tu-Chen (TW)

(73) Assignee: FIH Co., Ltd., Shindian (TW)

( * ) Notice: Subject to any disclaimer, the term of this patent is extended or adjusted under 35 U.S.C. 154(b) by 17 days.

(21) Appl. No.: 10/863,302

(22) Filed: Jun. 7, 2004

(65) Prior Publication Data

US 2004/0244147 A1 Dec. 9, 2004

(30) Foreign Application Priority Data

Jun. 6, 2003 (TW) .............................. 92210426 U

(51) Int. Cl.
*E05D 11/10* (2006.01)

(52) U.S. Cl. ............................. 16/330; 16/303; 16/386

(58) Field of Classification Search .................. 16/303, 16/330, 341, 386; 379/433.12, 433.13; 455/575.1, 455/575.4, 550.1, 90.3; 361/680–683
See application file for complete search history.

(56) References Cited

U.S. PATENT DOCUMENTS 5,628,089 A * 5/1997 Wilcox et al. ................. 16/303
5,697,124 A * 12/1997 Jung ............................ 16/341
6,065,187 A * 5/2000 Mischenko ................... 16/341
6,141,831 A * 11/2000 Novin et al. .................. 16/330
6,633,643 B1 * 10/2003 Ona ........................ 379/433.13
6,766,180 B1 * 7/2004 Doraiswamy et al. ... 455/575.1
2001/0053674 A1 * 12/2001 Katoh .......................... 455/90
2004/0177477 A1 * 9/2004 Hsieh .......................... 16/303

FOREIGN PATENT DOCUMENTS

| JP | 11006519 A | * | 1/1999 |
| JP | 2000017932 A | * | 1/2000 |
| JP | 2001116038 A | * | 4/2001 |
| JP | 2003065321 A | * | 3/2003 |
| JP | 2004068939 A | * | 3/2004 |
| TW | 411069 | | 11/2000 |
| WO | WO 3019804 A1 | * | 3/2003 |

* cited by examiner

*Primary Examiner*—Chuck Y. Mah
(74) *Attorney, Agent, or Firm*—Wei Te Chung

(57) ABSTRACT

A hinge assembly (10) includes a tubular hinge housing (11) encasing a follower member (14), a cam (13) and a spring (12) in an interior space thereof. The follower member has a connector (141), a shaft (143), and a cylindrical portion (142) having a flat surface (1421) and at least one tab (1424) formed on the flat surface. The cam forms at least one peak (1321) and one valley (1322) thereon. The cam and the spring are respectively inserted over the follower member. Wherein the cam is sildably engaged in the hinge housing, and is rotatably and sildably coupled to the shaft of the follower member so that the tab of the follower member is received in the valley of the cam. An insert member (15) is inserted into the interior space of the tubular hinge housing for retaining the follower member therein.

16 Claims, 4 Drawing Sheets

HINGE ASSEMBLY AND PORTABLE ELECTRONIC DEVICE HAVING SAME

BACKGROUND OF THE INVENTION

1. Field of the Invention

The present invention relates to an apparatus for hinging together the housings of foldable devices, and particularly to an apparatus for hinging together the housings of a foldable mobile phone.

2. Description of Related Art

Portable radiotelephones having two housings joined by a type of hinge that allows the housings to fold upon one another are known in the art. Some such folding radiotelephones have most of the electronics in one housing, called the main housing, and fewer electronics in the other housing, called the cover. Other such folding radiotelephones have all the electronics in the body with the cover serving only to cover the keypad or keypad and display of the phone.

TW Pat. No. 411069 discloses a hinge assembly 40 as shown in FIGS. 5–6. A rotating shaft 41 is respectively inserted through a washer 42, a stationary cam 43, a sliding cam 44, a spring 45, and a fixing member 46. An elastic ring clip 47 fitted to an engaging groove (not labeled) of the shaft 41 is locked to a deformed hole (not labeled) of the fixing member 46 by being mounted into the hole at an inside thereof. The shaft 41 is thereby fixed such that the shaft 41 does not come off the fixing member 46 and the fixing member 46 is rotated along with the shaft 41. A ring 48 is fitted to another engaging groove (not labeled) of the shaft 41. Furthermore, the fixing member 46 is fastened in and rotated along with the cover 50, and the stationary cam 43 is fixed in the main body of the mobile phone. The sliding cam 44 is rotated along with the shaft 41 and can linearly slide along the shaft 41. When the cover 50 is rotated, the fixing member 46 and the shaft 41 are rotated along with the cover, and the sliding cam 44 engages with the stationary cam 43 to retain the cover 50 in an opened or closed position. However, during cover rotation, the shaft 41 suffers a torsional force, so that the shaft 41 is in danger of being broken or damaged. Furthermore, the hinge assembly 40 is complex, and is not convenient to assemble in a limited retaining space of the mobile phone.

Therefore, an improved structure of a hinge assembly is desired which overcomes the disadvantages of the prior art.

SUMMARY OF THE INVENTION

A main object of the present invention is to provide a reliable and durable hinge assembly.

A hinge assembly comprises a tubular hinge housing encasing a follower member, a cam and a spring in an interior space thereof. The follower member has a connector, a shaft, and a cylindrical portion connecting the connector and the shaft. The cylindrical has a flat surface and at least one tab formed on the flat surface. The cam forms at least one peak and one valley thereon. The cam and the spring are respectively inserted over the follower member, and the spring is compressively engaged against both a surface of the cam and an inside wall of the tubular hinge housing. Wherein the cam is sildably engaged in the hinge housing, and is rotatably and sildably coupled to the shaft of the follower member so that the tab of the follower member is received in the valley of the cam. An insert member is inserted into the interior space of the tubular hinge housing for retaining the follower member therein.

Other objects, advantages and novel features of the invention will become more apparent from the following detailed description of a preferred embodiment thereof when taken in conjunction with the accompanying drawings, wherein:

DETAILED DESCRIPTION OF THE INVENTION

Figure 1:
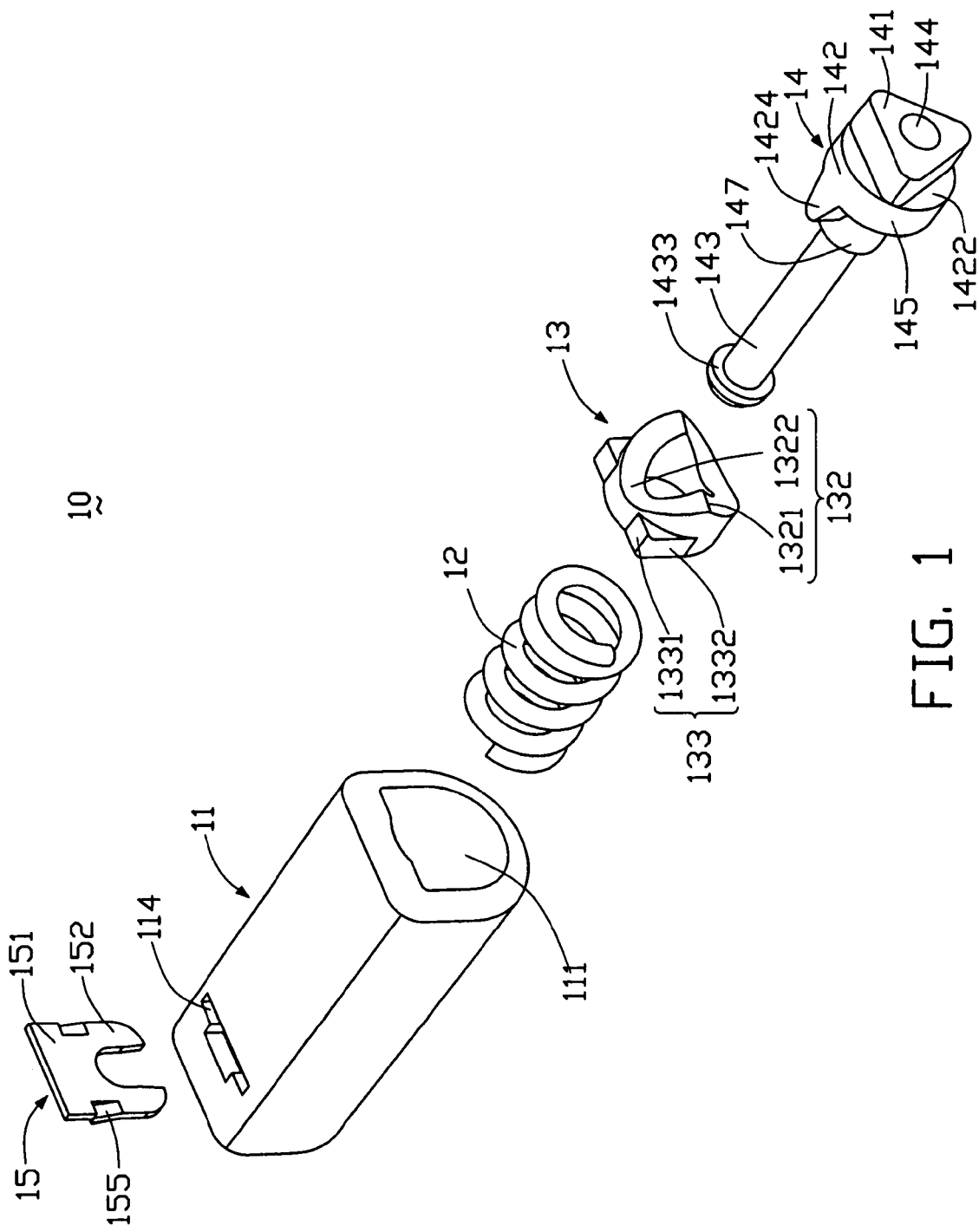
FIG. 1 is an exploded, perspective view of a hinge assembly in accordance with an embodiment of the present invention.

Referring now to the drawings in detail, FIG. 1 shows a hinge assembly 10. The hinge assembly 10 comprises a tubular hinge housing 11, a spring 12, a cam 13, a follower member 14, and an insert member 15.

Figure 2:
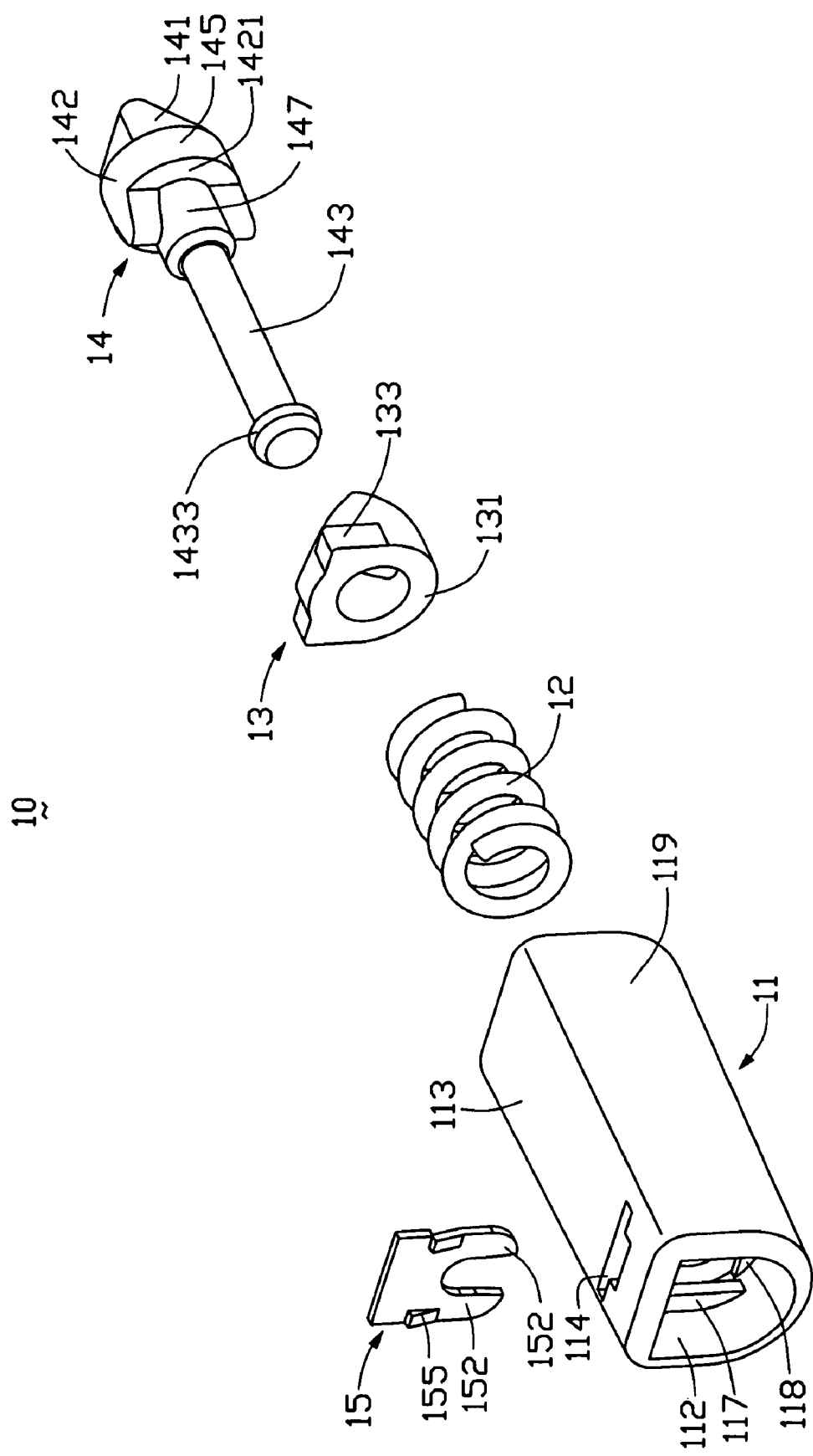
FIG. 2 is a reverse aspect view of the hinge assembly of FIG. 1.
Figure 3:
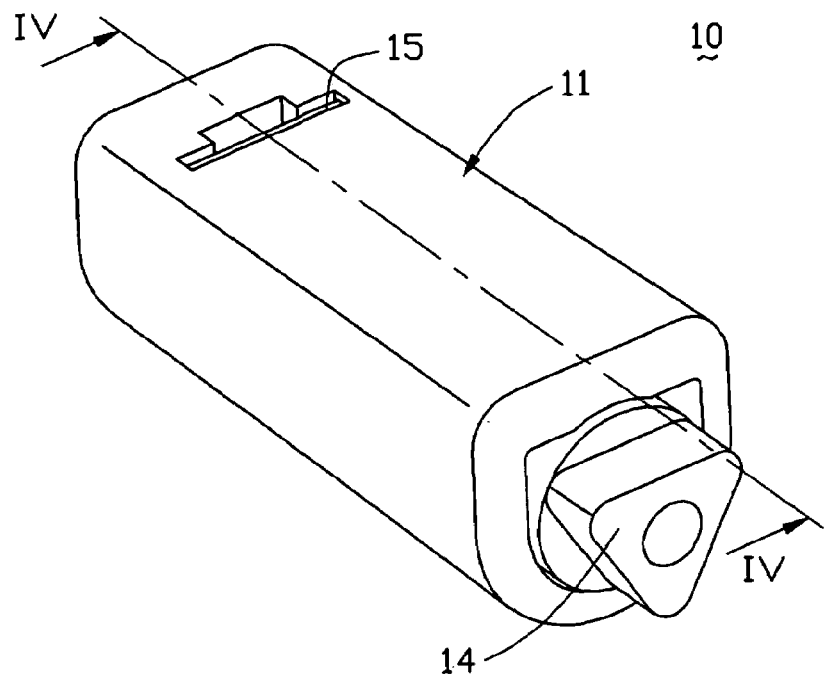
FIG. 3 is an assembled, perspective view of the hinge assembly of FIG. 1.
Figure 4:
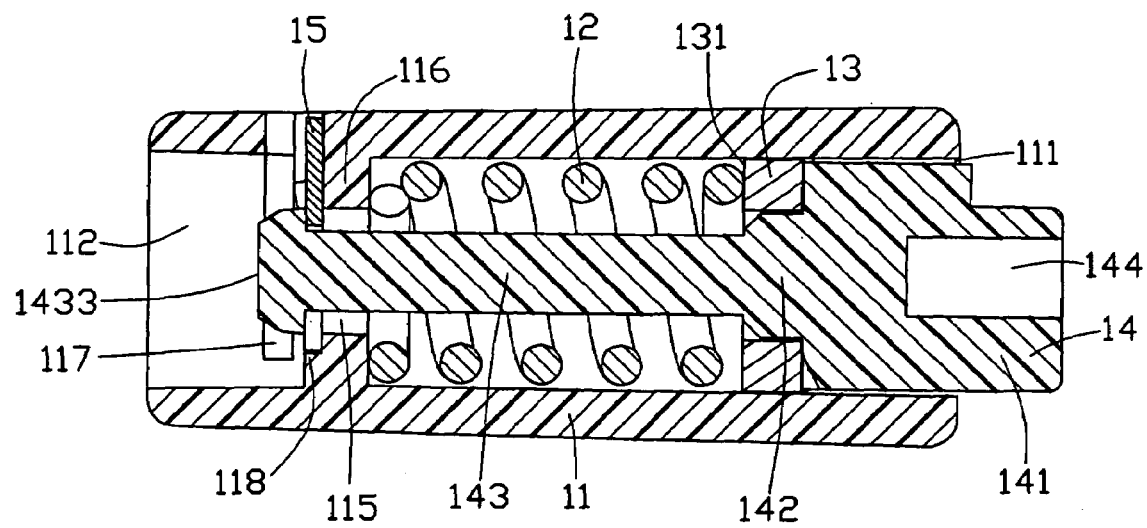
FIG. 4 is a cross-sectional view taken along a line IV—IV of FIG. 3.
Figure 5:
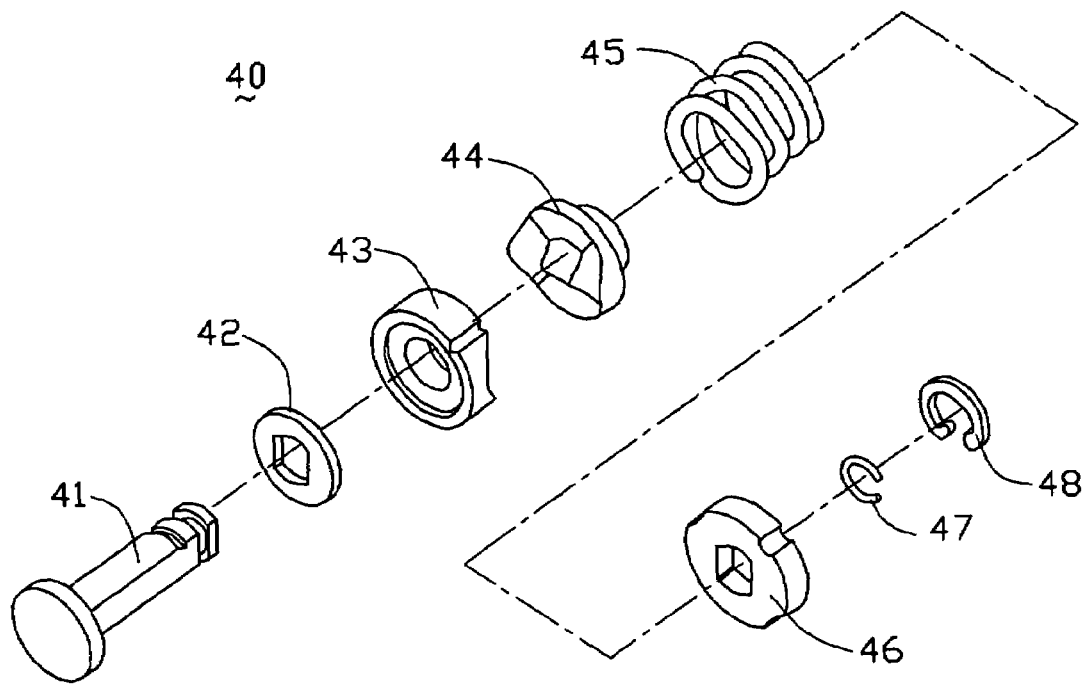
FIG. 5 is an exploded, perspective view of a hinge assembly of the prior art.
Figure 6:
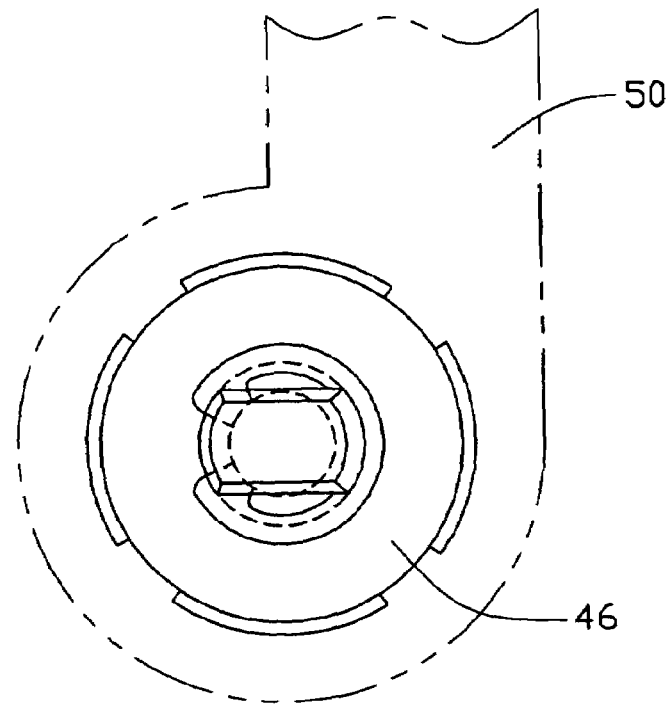
FIG. 6 is a side view of a part of a mobile phone with the hinge assembly of FIG. 5 assembled therein.

Also referring to FIGS. 2 and 4, the tubular hinge housing 11 has a D-shaped cross section, and thus forms a flat wall 113 and an arcuate wall 119, and interiorly defines an arcuate hollow channel (not labeled). The hollow channel is divided into three communicating sections according to their different radii of curvature. A third channel 115 (see FIG. 4) is disposed between a first channel 111 and a second channel 112. A radius of curvature of the third channel 115 is less than that of either the first or second channel 111, 112. A step 116 (shown in FIG. 4) is formed on an inside wall of the hinge housing 11, making a rearward limit of the first channel 111 and a forward limit of the second channel 112. A T-shaped groove 114 is defined through the flat wall 113 and communicates with the hollow channel to a rear of the step 116. Two tongues 117 are formed on an interior surface of the arcuate wall 119 in the second channel 112 aligned with a rear of the groove 114. The tongues 117 are separated from each other by one distance, and from the step 116 by a second distance. A support 118 (see FIG. 2) extends upwardly from an interior bottom of the arcuate wall 119, aligned beneath the groove 114, and integral with the step 116. The support 118 is used as a stop for the insert member 15 when the hinge assembly 10 is assembled.

The follower member 14 includes a connector 141, a cylindrical portion 142 and a shaft 143, wherein the cylindrical portion 142 connects the connector 141 and the shaft 143. The connector 141 is for being rigidly held in the main body of the mobile phone, and has a triangular shape with a hole 144 defined in its center to prohibit rotation of the follower member 14 relative to the main body. The cylindrical portion 142 includes a first cylinder 145 and an adjoining second cylinder 147. The second cylinder 147 has a smaller diameter than the first cylinder 145. The first cylinder 145 has a flat rear surface 1421, a flat front surface 1422 and a curved surface (not labeled) therebetween. A plurality of follower tabs 1424, preferably two tabs, is formed on the flat rear surface 1421 and extends rearwardly along a curved surface (not labeled) of the second cylinder 147. The follower tabs 1424 are located 180 degrees from one another. A lip 1433 is formed on a rear end of the shaft 143 and has a diameter slightly greater than that of the third channel 115.

The cam 13 is generally cylindrical in shape and has a hole (not labeled) therethrough. A flat ring surface 131 (see FIG. 2) is formed on a rear side of the cam 13, and a cam surface 132 (see FIG. 1) is formed on a front side. A curved surface (not labeled) is formed between the flat ring surface 131 and the cam surface 132. The cam surface 132 has peaks 1321 and valleys 1322 to mate with the flat rear surface 1421 of the follower member 14. A plurality of ribs 133, preferably two ribs 133, one on each of two opposite sides of the cam 13, is formed on the curved surface of the cam 13. Each of the ribs 133 may have two perpendicular, flat surfaces 1331 and 1332 to mate with the two corners (not labeled) of the interior walls of the hinge housing 11 so that the cam 13 cannot rotate relative to the hinge housing 11. When the hinge housing 11 rotates during opening or closing of the cover, the cam 13 rotates with it, but can slip longitudinally along the shaft 143 in the first channel 111.

The spring 12 is made of metal and is spiral-shaped.

The insert member 15 is generally claw-shaped, and includes a body 151 with two claws 152 extending downwardly therefrom. A space (not labeled) is defined between the two claws 152. A plurality of spring tabs 155 bends rearwardly from the body 151 of the insert member 15.

Referring to FIGS. 1–4, in assembly, first, the cam 13 slides over the shaft 143 of the follower member 14 and onto the curved surface of the second cylinder 147. The cam surface 132 mates with the flat rear surface 1421 of the first cylinder 145, so that the follower tabs 1424 are received in the valleys 1322 of the cam 13. Second, the spring 12 is placed over the shaft 143 and coupled between the cam 13 and the lip 1433 of the shaft 143. Then, the follower member 14 is pressed into the hollow channel of the hinge housing 11 until the lip 1433 is received in the second channel 112 and is between the two tongues 117 so that the spring 12 is compressively engaged between a forward wall of the step 116 and the flat ring surface 131 of the cam 13 in the first channel 111. Then the insert member 15 is inserted through the groove 114 into the hollow channel of the hinge housing 11 and is stopped on the support 118 with the spring tabs 155 abutting against the tongues 117 for assuring fixed retention of the insert member 15 in the groove 114, so that the shaft 143 is rotatablely located between the claws 152 of the insert member 15. The lip 1433 of the shaft 143 is stopped by the insert member 15 so that the follower member 14 cannot come off the hinge housing 11. The connector 141 is exposed outside of the hinge housing 11. Finally, The hinge housing 11 is inserted into a tubular knuckle of the cover of the mobile phone, and the connector 141 is engaged in the main body of the folding mobile phone.

In use, when the cover rotates between an open position and a closed position, the hinge housing 11 rotates therewith, thus the cam 13 also rotates along with the hinge housing 11 and slips along the shaft 143, allowing the follower tabs 1424 received in the valleys 1322 to pass over the peaks 1321 of the cam 13. Therefore, the cover is open with the follower tabs 1424 each mating with a first valley 1322, or closed, with the follower tabs 1424 each mating with a different, second valley 1322. The follower member 14 is stationary during the rotation of the cover of the mobile phone, and a torsional force is loaded on the cylindrical portion 142, so that a slight torsional force or even no torsional force is applied to the shaft 143, which protects the shaft 143 from being broken or damaged. Furthermore, by slightly pulling the insert member 15, the insert member 15 exits the groove 114, and thus the hinge assembly 10 is disassembled, so that an operator can easily replace a malfunctioning component of the hinge assembly 10.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A hinge assembly comprising:
    a tubular hinge housing forming a hollow channel therein, a step being formed on an interior wall of the tubular hinge housing;
    a follower member having a connector, a shaft, and a cylindrical portion connecting the connector and the shaft, the cylindrical portion having a flat surface and at least one tab formed on the flat surface;
    a insert member having two claws and being inserted into the hollow channel of the tubular hinge housing for retaining the follower member therein;
    a cam having a flat ring surface, a cam surface, and a curved surface between the flat ring surface and the cam surface, at least one peak and one valley formed on the cam surface; and
    a spring;
    wherein the spring, the cam, and the follower member are received in the tubular hinge housing with the connector exposed outside, the cam is slidably engaged with the tubular hinge housing, and is rotatably and longitudinally slidably coupled to the shaft of the follower member with the cam surface being coupled to the flat surface of the cylindrical portion of the follower member so that the at least one tab of the follower member is received in the at least one valley of the cam, the spring is coiled around the shaft and compressively engaged against both the flat ring surface of the cam and a surface of the step of the tubular hinge housing.

2. The hinge assembly as claimed in claim 1, wherein at least one rib is formed on the curved surface of the cam, and the at least one rib abuts against inner walls of the tubular hinge housing so that the cam is prevented from rotating relative to the tubular hinge housing but can longitudinally slip within the tubular hinge housing.

3. The hinge assembly as claimed in claim 2, wherein the at least one rib is two ribs, one on each of two opposite sides of the cam.

4. The hinge assembly as claimed in claim 1, wherein the at least one tab formed on the flat surface of the follower member is two tabs, which are spaced 180 degrees apart.

5. The hinge assembly as claimed in claim 1, wherein the shaft forms a lip at one end opposite the cylindrical portion.

6. The hinge assembly as claimed in claim 1, wherein a groove is formed through a wall of the tubular hinge housing, and the insert member is inserted through the groove.

7. The hinge assembly as claimed in claim 1, wherein at least one tongue is formed on the interior wall of the tubular hinge housing.

8. The hinge assembly as claimed in claim 7, wherein at least one spring tab is formed on the insert member, and the at least one spring tab abuts against the at least one tongue for fixing the insert member in the tubular hinge housing.

9. The binge assembly as claimed in claim 1, wherein the connector has a triangular shape.

10. The hinge assembly as claimed in claim 1, wherein the connector defines a hole in a center of a frontmost end thereof.

11. A portable electronic device comprising:
a cover;
a main body; and
a hinge assembly joining the cover to the main body; wherein
the hinge assembly comprises:
a spring;
a cam having a cam surface, at least one peak and at least one valley formed on the cam surface;
a follower member having a connector, a shaft, and a cylindrical portion connecting the connector and the shaft, the cylindrical portion having a flat surface and at least one tab formed on the flat surface;
a tubular hinge housing having at least one tongue formed on an interior wall thereof, the tubular hinge housing encasing the spring, the cam and the follower member in an interior space thereof with the connector of the follower member exposed outside of the tubular hinge housing; and
an insert member inserted into the interior space of the tubular hinge housing for retaining the follower member therein;
wherein the cam surface is coupled to the flat surface of the cylindrical portion of the follower member so that the at least one tab of the follower member is received in the at least one valley of the cam, the spring is coiled around the shaft and compressively engaged against both an outer surface of the cam and an inner surface of the tubular hinge housing, the tubular hinge housing is received in the cover while the connector of the follower member is engaged in the main body, so that the cam slips within the tubular hinge housing, and is rotatably and longitudinally slidably coupled to the shaft of the follower member during cover rotation.

12. The portable electronic device as claimed in claim 11, wherein at least one spring tab is formed on the insert member, and the at least one spring tab abuts against the at least one tongue for fixing the insert member in the tubular hinge housing.

13. A hinge assembly comprising:
a tubular hinge housing forming a hollow channel therein and a groove therethrough;
a cam being slidably but not rotatably received in the housing;
a follower member rotatably but not slidably received in the housing and defining means for engagement with the cam;
an insert member inserted into the groove and the hollow channel of the tubular hinge housing for retaining the follower member therein; and
a biasing means received in the housing and urging said cam toward the follower member.

14. The hinge assembly as claimed in claim 13, wherein the insert member has two claws.

15. The hinge assembly as claimed in claim 13, wherein at least one tongue is formed on an interior wall of the tubular hinge housing.

16. The hinge assembly as claimed in claim 15, wherein at least one spring tab is formed on the insert member, and the at least one spring tab abuts against the at least one tongue for fixing the insert member in the tubular hinge housing.

* * * * *